United States Patent
Salgues et al.

(10) Patent No.: US 11,787,235 B2
(45) Date of Patent: Oct. 17, 2023

(54) TIRE COMPRISING A CARCASS REINFORCEMENT LAYER HAVING IMPROVED ENDURANCE PROPERTIES

(71) Applicant: COMPAGNIE GENERALE DES ETABLISSEMENTS MICHELIN, Clermont-Ferrand (FR)

(72) Inventors: Nathalie Salgues, Clermont-Ferrand (FR); Auriane Frisch, Clermont-Ferrand (FR); Arnaud Gommez, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 622 days.

(21) Appl. No.: 16/764,045

(22) PCT Filed: Nov. 7, 2018

(86) PCT No.: PCT/FR2018/052752
§ 371 (c)(1),
(2) Date: May 14, 2020

(87) PCT Pub. No.: WO2019/097140
PCT Pub. Date: May 23, 2019

(65) Prior Publication Data
US 2020/0384808 A1    Dec. 10, 2020

(30) Foreign Application Priority Data

Nov. 17, 2017 (FR) ..................................... 1760864

(51) Int. Cl.
*B60C 1/00* (2006.01)
*B60C 9/20* (2006.01)
(Continued)

(52) U.S. Cl.
CPC .......... *B60C 1/0041* (2013.01); *B60C 1/0016* (2013.01); *B60C 9/2006* (2013.01);
(Continued)

(58) Field of Classification Search
CPC ... B60C 1/0041; B60C 1/0016; B60C 9/2006; B60C 2009/0276; B60C 2200/06;
(Continued)

(56) References Cited

U.S. PATENT DOCUMENTS

2011/0308689 A1* 12/2011 Domingo ................. B60C 9/04
                                                                    152/556
2014/0343216 A1* 11/2014 Custodero ................ B60C 1/00
                                                                    524/505
(Continued)

FOREIGN PATENT DOCUMENTS

| FR | 3 022 839 | 1/2016 |
| FR | 3 022 841 | 1/2016 |
| WO | WO 97/36724 | 10/1997 |

*Primary Examiner* — Ling Siu Choi
*Assistant Examiner* — Ronald Grinsted
(74) *Attorney, Agent, or Firm* — Cozen O'Connor

(57) ABSTRACT

A tire with a radial carcass reinforcement, made up of at least one layer of metal reinforcing elements inserted between two skim layers of elastomer compound containing a reinforcing filler made up of at least carbon black. The tensile elastic modulus at 10% elongation of at least the skim layer closest to the internal cavity of at least the carcass reinforcement layer closest to the internal cavity is less than 8.5 MPa and at least the said skim layer closest to the internal cavity of at least the carcass reinforcement layer closest to the internal cavity has a macrodispersion value Z greater than 85.

15 Claims, 1 Drawing Sheet

(51) Int. Cl.
    *C08F 36/08*     (2006.01)
    *C08K 3/04*     (2006.01)
    *C08K 3/22*     (2006.01)
    *C08K 3/36*     (2006.01)
    *C08K 9/02*     (2006.01)
    *C08L 7/00*     (2006.01)
    *B60C 9/02*     (2006.01)

(52) U.S. Cl.
    CPC ............... *C08F 36/08* (2013.01); *C08K 3/04* (2013.01); *C08K 3/22* (2013.01); *C08K 3/36* (2013.01); *C08K 9/02* (2013.01); *C08L 7/00* (2013.01); *B60C 2009/0276* (2013.01); *B60C 2200/06* (2013.01); *C08K 2003/2227* (2013.01); *C08K 2201/006* (2013.01)

(58) Field of Classification Search
    CPC ... C08F 36/08; C08F 3/04; C08K 3/22; C08K 3/36; C08K 2003/2227; C08K 2201/006; C08K 3/04; C08K 9/02; C09K 9/02; C08L 7/00
    USPC ........................................................ 152/556
    See application file for complete search history.

(56) References Cited

U.S. PATENT DOCUMENTS

2017/0120682 A1     5/2017     Rehab et al.
2017/0144486 A1     5/2017     Rehab et al.

* cited by examiner

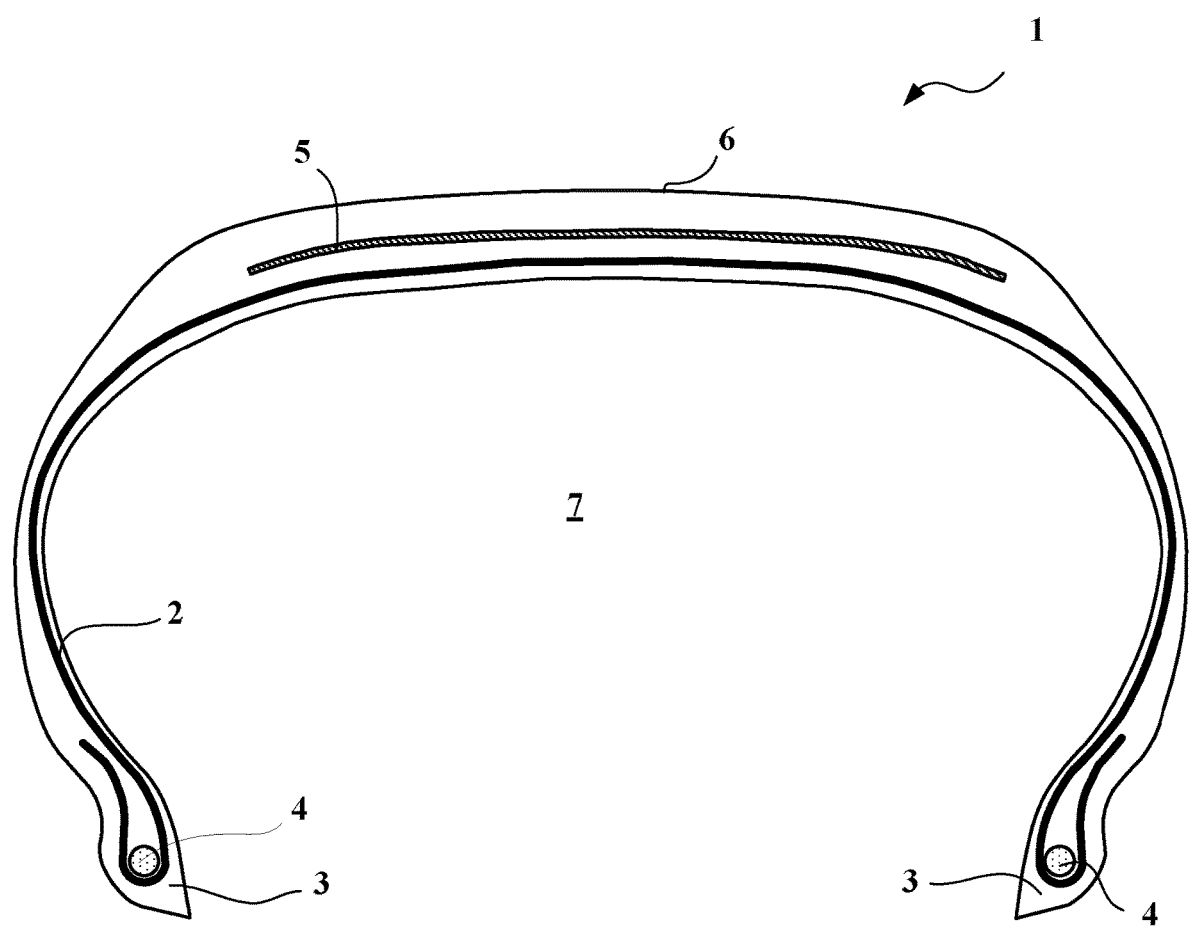

TIRE COMPRISING A CARCASS REINFORCEMENT LAYER HAVING IMPROVED ENDURANCE PROPERTIES

RELATED APPLICATIONS

This is a U.S. National Phase Application under 35 USC 371 of International Application PCT/FR2018/052752 filed on Nov. 7, 2018.

This application claims the priority of French application no. 17/60864 filed Nov. 17, 2017, the entire content of which is hereby incorporated by reference.

FIELD OF THE INVENTION

The present invention relates to a tire having a radial carcass reinforcement, and more particularly to a tire intended to equip vehicles that carry heavy loads and run at sustained speed, such as lorries, tractors, trailers or buses, for example.

BACKGROUND OF THE INVENTION

In tires of heavy-duty type, the carcass reinforcement is generally anchored on each side in the region of the bead and is surmounted radially by a crown reinforcement made up of at least two layers that are superimposed and formed of threads or cords which are parallel in each layer and crossed from one layer to the next, forming angles of between 10° and 45° with the circumferential direction. The said working layers that form the working reinforcement may furthermore be covered with at least one layer, referred to as protective layer, formed of reinforcing elements which are advantageously metal and extensible and are referred to as elastic reinforcing elements. It may also comprise a layer of metal threads or cords having low extensibility, forming an angle of between 45° and 90° with the circumferential direction, this ply, referred to as the triangulation ply, being situated radially between the carcass reinforcement and the first crown ply, referred to as the working ply, which are formed of parallel threads or cords lying at angles not exceeding 45° in terms of absolute value. The triangulation ply forms a triangulated reinforcement with at least the said working ply, this reinforcement having little deformation under the various stresses to which it is subjected, the triangulation ply essentially serving to absorb the transverse compressive forces to which all the reinforcing elements in the crown region of the tire are subjected.

The circumferential direction of the tire, or longitudinal direction, is the direction that corresponds to the periphery of the tire and is defined by the direction in which the tire runs.

The transverse or axial direction of the tire is parallel to the axis of rotation of the tire.

The radial direction is a direction that intersects the axis of rotation of the tire and is perpendicular thereto.

The axis of rotation of the tire is the axis about which it turns in normal use.

A radial or meridian plane is a plane which contains the axis of rotation of the tire.

The circumferential median plane, or equatorial plane, is a plane perpendicular to the axis of rotation of the tire and which divides the tire into two halves.

Some current tires, referred to as "road" tires, are intended to run at high speed and over increasingly long journeys, as a result of the improvement in the road network and of the growth of the motorway network throughout the world. The combination of conditions under which such a tire has to run undoubtedly allows an increase in the number of kilometres covered since tire wear is lower; however, the endurance of the tire is detrimentally affected. In order to allow one, or even two, retreadings of such tires in order to lengthen their life, it is necessary to retain a structure and notably a carcass reinforcement of which the endurance properties are sufficient to withstand the said retreadings.

Prolonged running under particularly severe conditions of the tires thus constructed effectively results in limits appearing regarding the endurance of these tires.

The elements of the carcass reinforcement are notably subjected to bending and compressive stresses during running, which adversely affect their endurance. Specifically, the cords which form the reinforcing elements of the carcass layers are subjected to high stresses during the running of the tires, in particular to repeated bending actions or variations in curvature, resulting in rubbing actions at the threads and thus in wear, and also in fatigue; this phenomenon is described as "fatigue fretting".

In order to fulfil their role of strengthening the carcass reinforcement of the tire, the said cords first of all have to exhibit good flexibility and high flexural endurance, this meaning in particular that their threads have a relatively small diameter, preferably less than 0.28 mm, more preferentially less than 0.25 mm, generally smaller than that of the threads used in conventional cords for the crown reinforcements of tires.

The cords of the carcass reinforcement are also subject to "fatigue corrosion" phenomena due to the very nature of the cords which favour the passage of, or even drain, corrosive agents such as oxygen and moisture. This is because the air or water which penetrates into the tire, for example when damaged by a cut or more simply as the result of the permeability, even though low, of the inner surface of the tire, can be conveyed by the channels formed within the cords by the very fact of their structure.

All of these fatigue phenomena, which are generally grouped together under the generic term of "fatigue fretting corrosion", cause a progressive deterioration in the mechanical properties of the cords and can, for the most severe running conditions, affect the life of these cords.

In order to improve the endurance of these cords of the carcass reinforcement, it is known in particular to increase the thickness of the layer of rubber which forms the internal wall of the cavity of the tire in order to limit as much as possible the permeability of the said layer. This layer is usually partly composed of butyl, so as to increase the airtightness of the tire. This type of material has the disadvantage of increasing the cost of the tire.

It is also known to modify the construction of the said cords in order notably to increase their penetrability by the rubber and thus limit the dimension of the passage for the oxidizing agents.

SUMMARY OF THE INVENTION

The inventors thus set themselves the task of providing tires for heavy vehicles of "heavy-duty" type, of which the performance, particularly endurance performance, is improved, in particular from the viewpoint of the "fatigue-corrosion" or "fatigue-fretting-corrosion" phenomena, regardless of the running conditions, and for which the cost of manufacture remains acceptable.

This objective has been achieved according to the invention by a tire with a radial carcass reinforcement, made up of at least one layer of metal reinforcing elements inserted between two skim layers of elastomer compound containing a reinforcing filler made up of at least carbon black, the said tire comprising a crown reinforcement, itself capped radially by a tread, the said tread being connected to two beads by two sidewalls, the said tire forming an internal cavity intended to accept inflation air, the elastic modulus under tension at 10% elongation of at least the skim layer closest to the internal cavity of at least the carcass reinforcement layer closest to the internal cavity being less than 8.5 MPa and at least the said skim layer closest to the internal cavity of at least the carcass reinforcement layer closest to the internal cavity having a macrodispersion value Z greater than 85.

A macrodispersion value Z of greater than 85 for a filled elastomer compound means that the filler is dispersed through the elastomer matrix of the composition with a dispersion value Z of greater than or equal to 85.

In the present description, the dispersion of filler in an elastomer matrix is characterized by the value Z which is measured, after crosslinking, according to the method described by S. Otto et al. in Kautschuk Gummi Kunststoffe, 58 Jahrgang, NR 7-8/2005, in accordance with standard ISO 11345.

The calculation of the value Z is based on the percentage of surface area in which the filler is not dispersed ("% undispersed surface area"), as measured by the "disperGRADER+" device supplied, with its operating procedure and its "disperDATA" operating software, by Dynisco, according to the equation:

$$Z=100-(\% \text{ undispersed surface area})/0.35.$$

The undispersed surface area percentage is, for its part, measured using a camera looking at the surface of the sample under incident light at 30°. The light points are associated with filler and agglomerates, whereas the dark points are associated with the rubber matrix; digital processing converts the image into a black and white image, and allows the percentage of undispersed surface area to be determined as described by S. Otto in the abovementioned document.

The higher the value Z, the better the dispersion of the filler in the rubber matrix (a value Z of 100 corresponding to perfect dispersion and a value Z of 0 corresponding to mediocre dispersion). A value Z of greater than or equal to 80 will be deemed to correspond to a surface area having very good dispersion of the filler in the elastomer matrix.

The elastomer compounds constituting at least the said radially outermost skim layer of at least one protective layer are prepared according to known methods.

In order to achieve a macrodispersion value Z of greater than 85, the elastomer compound may advantageously be prepared by creating a masterbatch of diene elastomer and of reinforcing filler.

For the purposes of the invention, a "masterbatch" is understood to mean an elastomer-based composite into which a filler has been introduced.

There are various methods of obtaining a masterbatch of diene elastomer and of reinforcing filler. In particular, one type of solution involves, in order to improve the dispersion of the filler in the elastomer matrix, mixing the elastomer and the filler in the "liquid" phase. To do this, use is made of an elastomer in the form of latex which is in the form of elastomer particles dispersed in water, and of an aqueous dispersion of the filler, i.e. a filler dispersed in water, commonly referred to as a "slurry".

Thus, according to one of the variants of the invention, the masterbatch is obtained by liquid-phase mixing starting from a diene elastomer latex containing natural rubber and an aqueous dispersion of a filler containing carbon black.

More preferentially still, the masterbatch according to the invention is obtained according to the following method steps that make it possible to obtain a very good dispersion of the filler in the elastomer matrix:

feeding a first continuous stream of a diene elastomer latex to a mixing zone of a coagulation reactor that defines an elongated coagulation zone extending between the mixing zone and an outlet, feeding the said mixing zone of the coagulation reactor with a second continuous stream of a fluid comprising a filler under pressure in order to form a mixture with the elastomer latex by mixing the first fluid and the second fluid in the mixing zone sufficiently energetically to coagulate the elastomer latex with the filler prior to the outlet, the said mixture flowing as a continuous stream towards the outlet zone and the said filler being capable of coagulating the elastomer latex, recovering the coagulum obtained previously at the outlet of the reactor in the form of a continuous stream and drying it in order to recover the masterbatch.

Such a method of preparing a masterbatch in the liquid phase is described for example in document WO 97/36724.

Advantageously according to the invention, the elastomer—filler bonding of the first layer S of polymer compound is characterized by a "bound rubber" content, measured prior to crosslinking, of greater than 35%.

The test referred to as the "bound rubber" test makes it possible to determine the proportion of elastomer, in a non-vulcanized composition, which is associated with the reinforcing filler so intimately that this proportion of elastomer is insoluble in the standard organic solvents. Knowing this insoluble proportion of rubber, which is fixed by the reinforcing filler during the mixing, gives a quantitative indication of the reinforcing activity of the filler in the rubber composition. Such a method has been described, for example, in standard NF-T-45-114 (June 1989) as applied to determining the content of elastomer bound to the carbon black.

This test, which is well known to those skilled in the art for characterizing the quality of reinforcement afforded by the reinforcing filler, has, for example, been described in the following documents: Plastics, Rubber and Composites Processing and Applications, Vol. 25, No 7, p. 327 (1996); Rubber Chemistry and Technology, Vol. 69, p. 325 (1996).

In this instance, the content of elastomer that cannot be extracted with toluene is measured after a sample of rubber composition (typically 300-350 mg) has been left for 15 days to swell in this solvent (for example in 80-100 cm$^3$ of toluene), followed by a step of drying for 24 hours at 100° C., under vacuum, before weighing the sample of rubber composition thus treated. The swelling step described hereinabove is preferably carried out at ambient temperature (approximately 20° C.) and away from light, and the solvent (toluene) is changed once, for example after the first five days of swelling. The "bound rubber" content (wt %) is calculated in the known way as the difference between the initial weight and the final weight of the sample of rubber composition, after the fraction of components that are insoluble by nature, other than the elastomer, initially present in the rubber composition have been accounted for and eliminated in the calculation.

The inventors have been able to demonstrate that a tire thus produced according to the invention results in highly advantageous improvements in terms of the compromise between endurance and manufacturing costs. Specifically, the endurance properties with such a tire are at least as good as with the best solutions mentioned hereinabove, whatever the running conditions, and without this in any way increasing manufacturing costs.

The tests performed showed that the use of the elastomer compounds according to the invention comprising a reinforcing filler made up of at least carbon black, having a tensile elastic modulus at 10% elongation of less than 8.5 MPa and a macrodispersion value Z of greater than 85, in order to produce at least the skim layer closest to the internal cavity of at least the carcass reinforcement layer closest to the internal cavity makes it possible to improve the properties of the tire in terms of endurance.

The inventors believe they have especially demonstrated that the choice of compounds according to the invention in order to produce at least the said skim layer closest to the internal cavity of at least the carcass reinforcement layer closest to the internal cavity which notably lead to a skim layer which is weakly conductive, compared with more conventional compounds, limits the phenomena of corrosion of the reinforcing elements of the said carcass reinforcement layer closest to the internal cavity.

This limiting of the risk of corrosion of the reinforcing elements of the carcass reinforcement layer may notably make it possible to limit the thicknesses of elastomer compounds between the reinforcing elements of the said carcass reinforcement layer and the internal cavity of the tire and therefore limit the costs of manufacture of the tire.

This reduction of the thicknesses of the elastomer compounds between the reinforcing elements of the said carcass reinforcement layer and the internal cavity of the tire also contributes to a lesser heating of the said compounds, notably in the regions of the beads of the tire which are highly stressed during running.

Furthermore, the tensile elastic moduli at 10% elongation of the skims of at least the skim layer closest to the internal cavity of at least the carcass reinforcement layer closest to the internal cavity appear favorable to performance in terms of endurance during running, and even contribute to lesser heating of the most highly stressed regions of the tire. Usually, the tensile elastic moduli at 10% elongation of the skims of the carcass reinforcement layers are greater than 8.5 MPa and mostly greater than 10 MPa, in order to limit the risks of peeling of the carcass reinforcement layers. The inventors also believe that the lesser heating of the regions of the tire that are the most highly stressed during running and notably of the bead regions contributes to limiting the risk of peeling of the carcass reinforcement layers.

Advantageously according to the invention, all of the skim layers of the carcass reinforcement have a tensile elastic modulus at 10% elongation of less than 8.5 MPa and a macrodispersion value Z of greater than 85.

According to one preferred embodiment of the invention, at least the said skim layer closest to the internal cavity of at least the carcass reinforcement layer closest to the internal cavity has an electrical resistivity per unit volume $\rho$ such that $\log(\rho)$ is greater than 8.

The electrical resistivity per unit volume $\rho$ is measured statically in accordance with standard ASTM D 257, $\rho$ being expressed in ohm·cm.

As a preference also, all of the skim layers of the carcass reinforcement layers have an electrical resistivity per unit volume $\square$ such that $\log(\square)$ is greater than 8.

According to a preferred embodiment of the invention, the maximum value of tan($\delta$), denoted tan($\delta$)max, of at least the skim layer closest to the internal cavity of at least the carcass reinforcement layer closest to the internal cavity is less than 0.080 and preferably less than 0.070.

Preferably, all of the skim layers of the carcass reinforcement have a maximum value of tan($\delta$), denoted tan($\delta$)max, of less than 0.080 and preferably less than 0.070.

The loss factor tan($\delta$) is a dynamic property of the layer of rubber compound. It is measured on a viscosity analyser (Metravib VA4000) according to standard ASTM D 5992-96. The response of a sample of vulcanized composition (cylindrical test specimen 2 mm thick and 78 mm² in cross section), subjected to sinusoidal loading in simple alternating shear stress at a frequency of 10 Hz, at a temperature of 100° C. is recorded. A sweep is carried out in deformation amplitude from 0.1 to 50% (outward cycle), then from 50% to 1% (return cycle). The results made use of are the complex dynamic shear modulus (G*) and the loss factor tan($\delta$) measured on the return cycle. For the return cycle, the maximum observed tan($\delta$) value is indicated, denoted tan ($\delta$)$_{max}$.

Rolling resistance is the resistance that occurs when the tire is rolling. It is represented by the hysteresis losses associated with the deformation of the tire during a revolution. The frequency values associated with the revolution of the tire correspond to tan($\delta$) values measured between 30 and 100° C. The value for tan($\delta$) at 100° C. thus corresponds to an indicator of the rolling resistance of the tire when rolling.

The inventors were further able to demonstrate that the choice of compounds according to this preferred embodiment of the invention in order to produce at least the skim layer closest to the internal cavity of at least the carcass reinforcement layer closest to the internal cavity makes it possible to improve the properties of the tire in terms of rolling resistance, due to the relatively low maximum value of tan($\delta$), denoted tan($\delta$)max.

According to a preferred embodiment of the invention, at least the skim layer closest to the internal cavity of at least the carcass reinforcement layer closest to the internal cavity is an elastomer compound based on natural rubber or on synthetic polyisoprene with a predominance of cis-1,4-linkages and possibly on at least one other diene elastomer, the natural rubber or synthetic polyisoprene in the case of a blend being present at a predominant content relative to the content of the other diene elastomer(s) used and on a reinforcing filler consisting:
  a) either of carbon black used at a content of between 20 and 80 phr,
  b) or of a blend of carbon black and a white filler, in which the overall filler content is between 20 and 80 phr, and preferably between 40 and 60 phr, the said white filler being of silica and/or alumina type, comprising SiOH and/or AlOH surface functions selected from the group consisting of precipitated or fumed silicas, aluminas or aluminosilicates, or else carbon blacks modified during or after synthesis, with a BET specific surface area of between 50 and 350 m²/g and/or a CTAB specific surface area of between 50 and 250 m²/g.

The BET specific surface area measurement is performed on the carbon black in accordance with the Brunauer, Emmet and Teller method described in "The Journal of the American Chemical Society", vol. 60, page 309, February 1938, corresponding to standard D6556-10.

The BET specific surface area of the silica is determined in a known way by gas adsorption using the Brunauer-Emmett-Teller method described in "The Journal of the American Chemical Society", Vol. 60, page 309, February 1938, more specifically according to French Standard NF ISO 9277 of December 1996.

The CTAB specific surface area is determined according to the method in NF T 45007 of November 1987 (method B).

If a clear filler or a white filler is being used, it is necessary to use a coupling agent and/or a covering agent selected from the agents known to those skilled in the art. Mention may be made, as examples of preferential coupling agents, of alkoxysilane sulfides of the bis(3-trialkoxysilylpropyl) polysulfide type and among these especially of bis(3-triethoxysilylpropyl) tetrasulfide, sold by Degussa under the name Si69 for the pure liquid product and the name X50S for the solid product (50/50 by weight blend with N330 black). Mention may be made, as examples of covering agents, of a fatty alcohol, an alkylalkoxysilane, such as a hexadecyltrimethoxysilane or hexadecyltriethoxysilane respectively sold by Degussa under the names Si116 and Si216, diphenylguanidine, a polyethylene glycol or a silicone oil, optionally modified by means of OH or alkoxy functions. The covering and/or coupling agent is used in a weight ratio relative to the filler of 1/100 and 20/100, and preferentially of between 2/100 and 15/100 when the clear filler represents the whole of the reinforcing filler and of between 1/100 and 20/100 when the reinforcing filler is composed of a blend of carbon black and clear filler.

Mention may be made, as other examples of reinforcing fillers that have the morphology and SiOH and/or AlOH surface functions of materials of the silica and/or alumina type described hereinabove and that can be used according to the invention as a partial or complete replacement for these, of carbon blacks modified either during synthesis by addition, to the oil fed to the oven, of a silicon and/or aluminium compound or after synthesis by addition, to an aqueous suspension of carbon black in a solution of sodium silicate and/or aluminate, of an acid so as to at least partially cover the surface of the carbon black with SiOH and/or AlOH functions. As nonlimiting examples of carbon-based fillers of this type with SiOH and/or AlOH surface functions, mention may be made of the fillers of CSDP type described in Conference No. 24 of the ACS Meeting, Rubber Division, Anaheim, California, 6-9 May 1997, and also those of patent application EP-A-0 799 854.

Included among the diene elastomers that can be used as a blend with the natural rubber or a synthetic polyisoprene with a predominance of cis-1,4-linkages, mention may be made of a polybutadiene (BR), preferably with a predominance of cis-1,4-linkages, a solution or emulsion stirene-butadiene copolymer (SBR), a butadiene-isoprene copolymer (BIR) or, alternatively still, a stirene-butadiene-isoprene terpolymer (SBIR). These elastomers can be elastomers modified during polymerization or after polymerization by means of branching agents, such as a divinylbenzene, or star-branching agents, such as carbonates, halotins or halosilicons, or alternatively still by means of functionalization agents resulting in grafting, to the chain or at the chain end, of oxygen-based carbonyl or carboxyl functions or else of an amine function, such as, for example, by the action of dimethylaminobenzophenone or diethylaminobenzophenone. In the case of blends of natural rubber or synthetic polyisoprene with a predominance of cis-1,4-linkages with one or more of the diene elastomers mentioned above, the natural rubber or the synthetic polyisoprene is preferably used at a predominant content and more preferentially at a content of greater than 70 phr.

Advantageously, according to a variant embodiment of the invention, the metal reinforcing elements of at least the carcass reinforcement layer closest to the internal cavity are non-wrapped cords having a flow rate of less than 20 $cm^3$/min in the "permeability" test.

The test referred to as the permeability test makes it possible to determine the longitudinal permeability to air of the cords tested, by measuring the volume of air passing along a test specimen under constant pressure over a given period of time. The principle of such a test, which is well known to those skilled in the art, is to demonstrate the effectiveness of the treatment of a cord to make it impermeable to air; it has been described for example in standard ASTM D2692-98.

The test is carried out on cords extracted directly, by stripping, from the vulcanized rubber plies which they reinforce, thus penetrated by the cured rubber.

The test is carried out on a 2 cm length of cord, which is therefore coated with its surrounding rubber compound (or coating rubber) in the cured state, in the following way: air is injected into the inlet of the cord at a pressure of 1 bar and the volume of air at the outlet is measured using a flow meter (calibrated for example from 0 to 500 $cm^3$/min). During the measurement, the sample of cord is immobilized in a compressed airtight seal (for example, a seal made of dense foam or of rubber) so that only the amount of air passing along the cord from one end to the other, along its longitudinal axis, is taken into account by the measurement; the airtightness of the airtight seal itself is checked beforehand using a solid rubber test specimen, that is to say one devoid of cord.

The lower the mean air flow rate measured (mean over 10 test specimens), the higher the longitudinal impermeability of the cord. As the measurement is carried out with an accuracy of ±0.2 $cm^3$/min, measured values of less than or equal to 0.2 $cm^3$/min are regarded as zero; they correspond to a cord which can be described as airtight (completely airtight) along its axis (i.e. in its longitudinal direction).

This permeability test also constitutes a simple means of indirect measurement of the degree of penetration of the cord by a rubber composition. The lower the flow rate measured, the greater the degree of penetration of the cord by the rubber.

Cords having a flow rate of less than 20 $cm^3$/min in the "permeability" test have a degree of penetration of greater than 66%.

Cords having a flow rate of less than 2 $cm^3$/min in the "permeability" test have a degree of penetration of greater than 90%.

According to this variant of the invention, the value, in the "permeability" test, of the metal reinforcing elements of at least the carcass reinforcement layer closest to the internal cavity may be obtained with compounds of the skim layers having a fluidity greater than those of the more customary compounds.

Such values in the "permeability" test seem also to improve the endurance of the tires. Indeed, greater penetration of the metal reinforcing elements of at least the carcass reinforcement layer closest to the internal cavity by the skim compounds is beneficial to lessening the propagation of the oxidizing agents within the reinforcing elements. In the case of attacks that may make it possible for the oxidizing agents to access the reinforcing elements, such a penetration of the reinforcing elements limits direct contact between the oxidizing agents and the metal reinforcing elements. The oxidation of the reinforcing elements thus continues to occur essentially due to the oxidizing agents passing as far as the skim layer, the intensity of the oxidation being decreased by the choice of the compounds constituting at least the skim layer closest to the internal cavity of at least the carcass reinforcement layer closest to the internal cavity, which compounds have weak electric conductivity.

Advantageously too, according to the invention, the cords of the carcass reinforcement in the test referred to as the permeability test exhibit a flow rate of less than 10 cm$^3$/min and more preferably of less than 2 cm$^3$/min.

According to one preferred embodiment according to this variant of the invention, the metal reinforcing elements of at least one layer of the carcass reinforcement are cords having at least two layers, at least one internal layer being sheathed with a layer consisting of a non-crosslinkable, crosslinkable or crosslinked rubber composition, preferably based on at least one diene elastomer.

The expression "composition based on at least one diene elastomer" means, in the known way, that the composition contains a predomination (i.e. a fraction by mass in excess of 50%) of this or these diene elastomer(s).

It will be noted that the sheath according to the invention extends continuously around the layer that it covers (which means to say that this sheath is continuous in the "orthoradial" direction of the cord, which direction is perpendicular to its radius) so as to form a continuous sleeve the cross section of which is advantageously practically circular.

It will also be noted that the rubber composition of this sheath may be crosslinkable or crosslinked, which means to say that by definition it comprises a crosslinking system suited to allowing the composition to crosslink when it is cured (i.e. to harden rather than to melt); thus, this rubber composition may then be qualified as unmeltable, because it cannot be melted whatever the temperature to which it is heated.

The term "diene" elastomer or rubber is understood to mean, in a known way, an elastomer which is based, at least partially (i.e. a homopolymer or a copolymer), on diene monomers (monomers bearing two conjugated or non-conjugated carbon-carbon double bonds).

Such reinforcing elements are, for example, described in patent application WO 2005/071157.

According to one preferred embodiment of the invention, the said layer consisting of a non-crosslinkable, crosslinkable or crosslinked rubber composition sheathing at least an internal layer of the cords of at least the carcass reinforcement layer closest to the internal cavity of the tire, preferably based on at least one diene elastomer, is an elastomer compound based on natural rubber or on synthetic polyisoprene with a predominance of cis-1,4-linkages and possibly on at least one other diene elastomer, the natural rubber or synthetic polyisoprene in the case of a blend being present at a predominant content relative to the content of the other diene elastomer(s) used and on a reinforcing filler consisting:

a) either of carbon black used at a content of between 20 and 80 phr,
b) or of a blend of carbon black and a white filler, in which the overall filler content is between 20 and 80 phr, and preferably between 40 and 60 phr, said white filler being of silica and/or alumina type, comprising SiOH and/or AlOH surface functions selected from the group consisting of precipitated or fumed silicas, aluminas or aluminosilicates, or else carbon blacks modified during or after synthesis, with a BET specific surface area of between 50 and 350 m$^2$/g and/or a CTAB specific surface area of between 50 and 250 m$^2$/g.

By way of preference, the composition of the said layer is chosen to be identical to the composition used for at least the skim layer closest to the internal cavity of at least the carcass reinforcement layer closest to the internal cavity. Thus, there is no problem of potential incompatibility between the respective materials of the said layer and of the skim layer.

According to one variant of the invention, the metal reinforcing elements of at least the carcass reinforcement layer closest to the internal cavity are layered metal cords of [L+M] or [L+M+N] construction that can be used as reinforcing elements in a tire carcass reinforcement, comprising a first layer C1 of L threads of diameter $d_1$, with L ranging from 1 to 4, surrounded by at least one intermediate layer C2 of M threads of diameter $d_2$ wound together in a helix at a pitch $p_2$ with M ranging from 3 to 12, the said layer C2 possibly being surrounded by an outer layer C3 of N threads of diameter $d_3$ wound together in a helix at a pitch $p_3$ with N ranging from 8 to 20, a sheath consisting of a crosslinkable or crosslinked rubber composition based on at least one diene elastomer covering the said first layer C1 in the [L+M] construction and at least the said layer C2 in the [L+M+N] construction.

Preferably, the diameter of the threads of the first layer of the internal layer (C1) is between 0.10 and 0.5 mm and the diameter of the threads of the external layers (C2, C3) is between 0.10 and 0.5 mm.

For preference also, the pitch of the helix at which the said threads of the external layer (C3) are wound is comprised between 8 and 25 mm.

Within the meaning of the invention, the pitch represents the length, measured parallel to the axis of the cord, at the end of which a thread having this pitch completes a full turn around the axis of the cord; thus, if the axis is sectioned by two planes perpendicular to the said axis and separated by a length equal to the pitch of a thread of a layer forming the cord, the axis of this thread has, in these two planes, the same position on the two circles corresponding to the layer of the thread in question.

The cord according to the invention, when it comprises at least one internal layer sheathed with a layer consisting of a non-crosslinkable, crosslinkable or crosslinked rubber composition, preferably based on at least one diene elastomer, may be obtained by various techniques known to a person skilled in the art, for example in two steps, initially by sheathing the core or intermediate L+M structure (layers C1+C2) via an extrusion head, this step being followed, in a second step, by a final operation in which the remaining N threads (layer C3) are cabled or twisted around the layer C2 thus sheathed. The problem of tack in the raw state posed by the rubber sheath during the possible intermediate winding and unwinding operations may be solved in a way known to a person skilled in the art, for example by the use of an interposed plastic film.

According to a variant embodiment of the invention, the crown reinforcement of the tire is formed of at least two working crown layers of inextensible reinforcing elements that are crossed from one layer to the other and form, with the circumferential direction, angles of between 10° and 45°.

According to other variant embodiments of the invention, the crown reinforcement also has at least one layer of circumferential reinforcing elements.

One preferred embodiment of the invention also provides for the crown reinforcement to be supplemented radially on the outside by at least one additional layer, referred to as a protective layer, of reinforcing elements, referred to as elastic reinforcing elements, that are oriented relative to the circumferential direction at an angle of between 10° and 45° and in the same direction as the angle formed by the inextensible elements of the working layer radially adjacent to it.

The crown reinforcement may be further supplemented, radially on the inside between the carcass reinforcement and the radially inner working layer closest to the said carcass reinforcement, by a triangulation layer made of inextensible steel metal reinforcing elements that form an angle of greater than 60° with the circumferential direction and in the same direction as that of the angle formed by the reinforcing elements of the radially closest layer of the carcass reinforcement.

BRIEF DESCRIPTION OF THE DRAWINGS

Further details and advantageous features of the invention will become evident hereinafter from the description of some exemplary embodiments of the invention given with reference to the FIGURE which depicts a meridian view of a design of a tire according to one embodiment of the invention.

For ease of understanding, the FIGURE is not drawn to scale.

In FIG. 1, the tire 1, of size 315/70 R 22.5, comprises a radial carcass reinforcement 2 anchored in two beads 3 around bead wires 4. The carcass reinforcement 2 is formed of a single layer of metal cords inserted between two skim layers. The carcass reinforcement 2 is hooped by a crown reinforcement 5, itself capped by a tread 6. The FIGURE also shows the tire cavity 7 intended to accept the inflation air.

DETAILED DESCRIPTION OF THE DRAWINGS

In accordance with the invention, the tensile elastic modulus at 10% elongation of the skim layers of the carcass reinforcement layer 2 is less than 8.5 MPa and the macro-dispersion value Z is greater than 85.

The value of $\log(\rho)$, which expresses the electrical resistivity of the skim layers of the carcass reinforcement layer 2, is greater than 8 Ohm·cm.

The maximum value of $\tan(\delta)$, denoted $\tan(\delta)$max, of the skim layers of the carcass reinforcement layer 2 is less than 0.070.

Tests were carried out with different tires produced according to the invention and compared with reference tires.

Tests are carried out by varying the characteristics of the skim layer compounds of the carcass reinforcement layer 2, especially their tensile elastic modulus at 10% elongation and the value Z.

The various compounds used are listed below.

|  | Compound R1 | Compound 1 | Compound 2 |
|---|---|---|---|
| NR | 100 | 100 | 100 |
| Black N347 |  | 50 |  |
| Black N326 |  |  |  |
| Black N234 | 61 |  | 40 |
| Antioxidant (6PPD) | 1.8 | 1 | 1 |
| Stearic acid | 0.6 | 0.65 | 0.65 |
| Zinc oxide | 9.3 | 9.3 | 9.3 |
| Cobalt salt (CoAcac) | 1.12 | 1.12 | 1.12 |
| Sulfur | 7 | 6.1 | 6.1 |
| Accelerator DCBS | 0.93 | 0.93 | 0.93 |
| Retarder CTP PVI |  | 0.25 | 0.25 |
| $MA_{10}$(MPa) | 9.8 | 6.4 | 5.3 |
| $\tan(\delta)_{max}$ | 0.12 | 0.069 | 0.060 |
| Resistivity (logrho) | 3 | 9 | >10 |
| Value Z | 77 | 92 | 89 |

The tires I1 and I2 according to the invention are produced with a carcass reinforcement layer of which the skims consist of compounds selected from the compounds 1 and 2.

The cords of the carcass reinforcement layer are non-wrapped layered cords of 1+6+12 structure, made up of a central nucleus formed of one thread, of an intermediate layer formed of six threads, and of an outer layer formed of twelve threads.

It has the following features (d and p in mm):
1+6+12 structure;
$d_1$=0.20 (mm);
$d_2$=0.18 (mm);
$p_2$=10 (mm);
$d_3$=0.18 (mm);
$p_2$=10 (mm);
$(d_2/d_3)$=1;
with $d_2$ and $p_2$ respectively the diameter and the helical pitch of the intermediate layer and $d_3$ and $p_3$ respectively the diameter and the helical pitch of the threads of the external layer.

The cords of the tires I1 according to the invention have an aptitude for penetration, measured in accordance with the method described hereinabove, of less than 10%.

The core of the cords of the tires I2 according to the invention, which is made up of the central nucleus formed of the thread and of the intermediate layer formed of six threads, is sheathed with a rubber composition. The sheathing is obtained via a head for extrusion of the core, followed by a final operation in which the 12 threads are twisted or cabled around the core thus sheathed.

The elastomer composition that makes up the rubber sheath is produced from the compounds 1 and 2 and, in this particular instance, has the same formulation as that of the skim layers of the carcass reinforcement layer.

The aptitude for penetration of the cords of the tires I2 according to the invention, measured according to the method described above, is equal to 95%.

Reference tires T are produced with a carcass reinforcement layer, the skims of which are made up of the compound R1.

The cords of the carcass reinforcement layer of the reference tires T are identical to those of the tires I1 according to the invention.

Rolling endurance tests performed on rolling road were conducted on a test machine that imposed nominal conditions of use on the tires, with the tire inflation being doped with oxygen and containing water. The tests were carried out for the tires according to the invention under conditions identical to those applied to the reference tires.

After sufficient running, leading to pronounced degradation of the carcass reinforcement layer of the reference tires T, the reinforcing elements of the carcass reinforcement layer are analysed. The measurements carried out correspond to corroded lengths of reinforcing elements and numbers of breakages of the said reinforcing elements.

Identical measurements are carried out on the tires I1 and I2 produced according to the invention, after covering an identical distance to that covered by the tires T under the same conditions.

The results are expressed in the following table with reference to a base 100 fixed for the reference tires T. One base 100 is fixed on the one hand for corroded lengths of reinforcing elements and another base 100 for the count of breakages of reinforcing elements.

| | Tire T | Tire I1 | Tire I2 |
|---|---|---|---|
| Corroded length | 100 | 80 | 70 |
| Number of breakages | 100 | 70 | 60 |

These tests show especially that the design of the tires according to the invention makes it possible to delay corrosion of the reinforcing elements of the protective layer and is therefore favorable to performance regarding the endurance of the tires.

Moreover, rolling resistance measurements were taken. These measurements related to the reference tire T, the compound R1 being used for the skim layers of the carcass reinforcement layer, and to tires according to the invention I1 as described above, the compound 2 being used for the skim layers of the carcass reinforcement layer.

The results of the measurements are given in the table below; they are expressed in kg/t, a value of 100 being assigned to the tire T.

| Tire T | Tire I1 |
|---|---|
| 100 | 98 |

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire forming an internal cavity intended to accept inflation air, comprising:
a radial carcass reinforcement, made up of:
two skim layers of elastomer compound containing a reinforcing filler made up of at least carbon black; and
at least one layer of metal reinforcing elements inserted between two skim layers of elastomer compound containing a reinforcing filler made up of at least carbon black;
two beads;
two sidewalls;
a tread connected to the two beads by the two sidewalls;
a crown reinforcement that is capped radially by the tread;
wherein a tensile elastic modulus at 10% elongation of at least a skim layer closest to the internal cavity of at least the carcass reinforcement layer is less than 8.5 MPa and
wherein at least a radially inner skim layer of at least the carcass reinforcement layer arranged closest to the internal cavity has a macrodispersion value Z greater than 85.

2. The tire according to claim 1, wherein a maximum value of tan($\delta$) of at least the skim layer closest to the internal cavity of at least the carcass reinforcement layer closest to the internal cavity is less than 0.080.

3. The tire according to claim 1, wherein at least the radially inner skim layer of at least the carcass reinforcement layer closest to the internal cavity is an elastomer compound based on natural rubber or on synthetic polyisoprene with a predominance of cis-1,4-linkages and optionally on at least one other diene elastomer, the natural rubber or synthetic polyisoprene in the case of a blend being present at a predominant content relative to the content of the other diene elastomer(s) used, and on a reinforcing filler consisting either of:
a) carbon black used at a content of between 20 and 80 phr, or
b) a blend of carbon black and a white filler, in which the overall filler content is between 20 and 80 phr, the aid white filler being of silica and/or alumina type, comprising SiOH and/or AlOH surface functions selected from the group consisting of precipitated or fumed silicas, aluminas or aluminosilicates, or else carbon blacks modified during or after synthesis, with a BET specific surface area of between 50 and 350 $m^2$/g and/or a CTAB specific surface area of between 50 and 250 $m^2$/g.

4. The tire according to claim 1, wherein at least the skim layer closest to the internal cavity of at least the carcass reinforcement layer closest to the internal cavity has an electrical resistivity per unit volume $\rho$ such that $\log(\rho)$ is greater than 8.

5. The tire according to claim 1, wherein the metal reinforcing elements of at least the carcass reinforcement layer closest to the internal cavity are non-wrapped cords having a flow rate of less than 20 $cm^3$/min in the permeability test.

6. The tire according to claim 5, wherein the metal reinforcing elements of at least the carcass reinforcement layer closest to the internal cavity are non-wrapped cords having a flow rate of less than 10 $cm^3$/min in the permeability test.

7. The tire according to claim 6, wherein the metal reinforcing elements of at least one layer of the carcass reinforcement are cords having at least two layers, at least one internal layer being sheathed with a layer consisting of a non-crosslinkable, crosslinkable or crosslinked rubber composition.

8. The tire according to claim 7, wherein the said layer consisting of a non-crosslinkable, crosslinkable or crosslinked rubber composition sheathing at least an internal layer of the cords of at least the carcass reinforcement layer closest to the internal cavity of the tire, is an elastomer compound based on natural rubber or on synthetic polyisoprene with a predominance of cis-1,4-linkages and optionally on at least one other diene elastomer, the natural rubber or synthetic polyisoprene in the case of a blend being present at a predominant content relative to the content of the other diene elastomer(s) used, and on a reinforcing filler consisting either of:
a) carbon black used at a content of between 20 and 80 phr, or
b) a blend of carbon black and a white filler, in which the overall filler content is between 20 and 80 phr, the white filler being of silica and/or alumina type, comprising SiOH and/or AlOH surface functions selected from the group consisting of precipitated or fumed silicas, aluminas or aluminosilicates, or else carbon blacks modified during or after synthesis, with a BET specific surface area of between 50 and 350 $m^2$/g and/or a CTAB specific surface area of between 50 and 250 $m^2$/g.

9. The tire according to claim 7, wherein the metal reinforcing elements of at least the carcass reinforcement layer closest to the internal cavity are layered metal cords of [L+M] or [L+M+N] construction that can be used as reinforcing elements in a tire carcass reinforcement, comprising a first layer C1 of L threads of diameter $d_1$, with L ranging from 1 to 4, surrounded by at least one intermediate layer C2 of M threads of diameter $d_2$ wound together in a helix at a pitch $p_2$ with M ranging from 3 to 12, the said layer C2 optionally being surrounded by an outer layer C3 of N threads of diameter $d_3$ wound together in a helix at a pitch $p_3$ with N ranging from 8 to 20, and wherein a sheath consisting of a crosslinkable or crosslinked rubber composition based on at least one diene elastomer covers the said first layer C1 in the [L+M] construction and at least the said layer C2 in the [L+M+N] construction.

10. The tire according to claim 9, wherein the diameter of the threads of the first layer (C1) is between 0.10 and 0.5 mm, and wherein the diameter of the threads of the layers (C2, C3) is between 0.10 and 0.5 mm.

11. The tire according to claim 9, wherein the helical pitch at which the said threads of the external layer (C3) are wound is between 8 and 25 mm.

12. The tire according to claim 1, wherein the crown reinforcement is formed of at least two working crown layers of inextensible reinforcing elements that are crossed from one layer to the other and form, with the circumferential direction, angles of between 10° and 45°.

13. The tire according to claim 1, wherein the crown reinforcement furthermore comprises at least one layer of circumferential reinforcing elements.

14. The tire according to claim 1, wherein the crown reinforcement is supplemented radially on the outside by at least one additional ply of "elastic" reinforcing elements, oriented at an angle of between 10° and 45° relative to the circumferential direction and in the same direction as the angle formed by the inextensible working ply elements radially adjacent thereto.

15. The tire according to claim 1, wherein the crown reinforcement furthermore comprises a triangulation layer formed of metal reinforcing elements forming angles of greater than 60° with the circumferential direction.

* * * * *